United States Patent
Mizutani et al.

(10) Patent No.: US 8,095,004 B2
(45) Date of Patent: Jan. 10, 2012

(54) PASSIVE OPTICAL NETWORK SYSTEM AND OPERATION METHOD OF THE SAME

(75) Inventors: Masahiko Mizutani, Yokohama (JP); Yusuke Yajima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 551 days.

(21) Appl. No.: 12/359,413

(22) Filed: Jan. 26, 2009

(65) Prior Publication Data

US 2009/0245790 A1 Oct. 1, 2009

(30) Foreign Application Priority Data

Mar. 31, 2008 (JP) .................................. 2008-089126

(51) Int. Cl.
*H04B 10/08* (2006.01)
*H04B 10/00* (2006.01)
(52) U.S. Cl. ......................... 398/25; 398/167.5; 398/168
(58) Field of Classification Search ................. 398/9, 15, 398/25, 35, 47, 165, 167.5, 168
See application file for complete search history.

(56) References Cited

OTHER PUBLICATIONS

Recommendations of International Telecommunications Union—Telecommunication Standardization Sector ITU-T Recommendation G.984.1.
Recommendations of International Telecommunications Union—Telecommunication Standardization Sector ITU-T Recommendation G.984.2.
Recommendations of International Telecommunications Union—Telecommunication Standardization Sector ITU-T Recommendation G.984.3.

*Primary Examiner* — Armando Rodriguez
(74) *Attorney, Agent, or Firm* — Antonelli, Terry, Stout & Kraus, LLP.

(57) ABSTRACT

In a passive optical network system, in order that by measuring a transmission distance and a transmission time between an OLT and an ONU in operation of the system, if the distance or the time is short, communication is conducted at a high transmission speed to increase a capacity of user; if the distance or the time is long, communication is conducted at a low transmission speed to increase the capacity of user communicating in a state in which a predetermined quality is secured, a main station includes a signal communication circuit to communicate with subsidiary stations at a first or second transmission speed and a controller to measure a transmission distance or a transmission time between the main station and each subsidiary station. Based on a result of the measurement, the controller selects a transmission speed for communication with the subsidiary station.

7 Claims, 9 Drawing Sheets

PASSIVE OPTICAL NETWORK SYSTEM AND OPERATION METHOD OF THE SAME

INCORPORATION BY REFERENCE

The present application claims priority from Japanese application JP2008-089126 filed on Mar. 31, 2008, the content of which is hereby incorporated by reference into this application.

BACKGROUND OF THE INVENTION

The present invention relates to a configuration and an operation method of a passive optical network system in which a plurality of subscriber connecting units shares an optical transmission line.

Since the communication speed is increasing and the communication range is expanding also in access networks to connect subscribers to communication networks, it has been considered to introduce a Passive Optical Network system (to be referred to as PON system hereinbelow) prescribed by, for example, recommendations of International Telecommunications Union-Telecommunication Standardization Sector (to be referred to as ITU-T hereinbelow; ITU-T Recommendation G.984.1, G.984.2, G.984.3). The PON system is a system in which an Optical Line Termination (to be referred to as OLT hereinbelow) to be connected to a higher-level communication network is connected to an Optical Network Unit (to be referred to as ONU hereinbelow) to accommodate a plurality of subscribers' terminals (Personal Computers (PC) and telephones) by use of a passive optical network including a basic trunk optical fiber line, an optical splitter, and a plurality of branch optical fiber lines. Specifically, signals from terminals (e.g., PC) connected to the respective ONU are sent in the form of optical signals via branch optical fiber lines. The optical signals are optically multiplexed using time division by the optical splitter on the basic trunk optical fiber to be sent to the OLT. The OLT receive the signals from the respective ONU to process the signals and then transmit the signals to an access/core network behind the OLT (to be referred to as access/core network hereinbelow) or to a second ONU connected to the pertinent ONU.

In the introduction of PON systems, a relatively low-speed system which operates at 64 kilobits per second (Kbps) is introduced in the initial stage. At present, a relatively high-speed system operating at a high transmission speed of about 2.4 Gigabits per second (Gbps) standardized according to ITU-T recommendations is being increasingly introduced. In addition, it is desired to implement in the future a higher-speed PON system capable of handling signals of a transmission bit rate ranging from 10 Gbps to 40 Gbps. To realize such high-speed PON system, there have been discussed various multiplexing methods such as the Time Division Multiplexing (TDM) method to divide a large number signals with respect to time and a Wavelength Division Multiplexing (WDM) method to divide a lot of signals with respect to the wavelength. Primarily, adoption of the TDM method is being discussed in consideration of affinity or and compatibility thereof to existing PON systems.

Additionally, discussion has been started for a PON system including a lower-speed PON and a higher-speed PON in which the transmission speed of the system is sequentially increased. That is, discussion has been conducted also for a configuration and an operation method of such PON system in which a plurality of PON systems coexist by use of a time-division multiplexing method using one and the same wavelength in terms of optical characteristics. To provide inexpensive and less power consuming access networks, there have been proposed various PON system configurations and operation methods such as a method of increasing the number of subscribers to be accommodated, a method of elongating the transmission distance, and a method of increasing the transmission speed. Also, improvement of characteristics of associated devices such as an optical amplifier and transceiver has been discussed. For example, to implement data transmission at 10 Gbps by use of existing optical fiber lines (32 or 64 branch lines; transmission density of 20 km), the Full Service Access Network (FSAN) as a standardization organization is discussing adoption of a semiconductor optical amplifier (SOA or Erbium-Doped Fiber Amplifier (EDFA), Praseodymium-Doped Fiber Amplifier (PDFA)); an electro-absorption modulator integrated distributed feedback laser (EA/DFB), a highly-sensitive receiver (Avalanche Photodiode (APD)), Forward Error Correction (FEC), and a dispersion compensating function for optical electric signals.

SUMMARY OF THE INVENTION

To provide a low-priced PON system, it is essentially required that facilities are shared, e.g., optical fiber is shared; the transmission performance is enhanced, and the number of subscribers to be accommodated is increased. When increasing the number of users to be accommodated, there may employed a method in which the number of branches is increased by sustaining the transmission distance of the existing PON. Alternatively, in addition to the increase of the branches, it is also considerable that the transmission distance of the PON is elongated to thereby accommodate new users more apart than the OLT.

In this situation, there arises a problem of dispersion in distance between the OLT as a carrier constituting the PON and the ONU installed in houses of users. In operation of the PON being used at present (i.e., a Gigabit-capable PON (GPON) of 2.4 Gbps), the OLT-ONU distance is about 20 kilometers (Km) or less in most case. However, it is known, in signal transmission at 10 Gbps or more which is to be assumed in the next-generation PON, that the transmission distance is lowered due to deterioration in the signal waveform and the increase in noise on the receiver side. It is hence difficult to secure the 20 km transmission without modifying the parts or components (technique) being used at present. To remove the difficulty, it is possible to employ a method in which the number of communicable users is increased by increasing the signal multiplexing degree on the optical fiber, a method in which transmission optical power is enhanced to compensate the branch loss by the splitter, and a method of introducing various parts and components described above. However, simultaneous introduction of these methods results in increase in the system cost.

Elongation of the OLT-ONU transmission distance in the PON leads to increase in the number of users (ONU) per OLT. It is therefore an object of the present invention to provide a configuration and an operation method of the PON in which the number of users to be accommodated can be increased by elongating the transmission distance while suppressing the increase in the system cost.

More specifically, the present invention provides a configuration and an operation method of the PON accommodating a large number of users on access lines by sharing optical fiber in which the transmission bit rate is changed according to the transmission distance of the optical section of each user to thereby expand the distance between a user (ONU) which can be accommodated and a carrier station (OLT), i.e., a dynamic range which can be covered by a single station) and the transmission bit rate is suppressed when the transmission distance is long to thereby reduce power consumed by the communication apparatus.

In order to solve the problem above, in the configuration of the PON of the present invention, the transmission distance and the transmission time between the OLT and the ONU are measured during the operation of the PON. If the distance and the time are short, the communication is carried out at a higher transmission speed to increase the number of users to be accommodated. Additionally, in a case wherein the OLT-ONU distance is long, if the communication is conducted at a high transmission speed, the consumption power and the cost are increased. Hence, to increase the number of accommodated users communicatable in a state in which a predetermined communication quality is secured, the measurement is carried out by conducting the communication using a lower transmission speed. According to results of the measurement, the transmission speed between the OLT and the ONU is selected for communication.

Specifically, there is provided according to the present invention a PON system including a main station, a plurality of subsidiary stations, and an optical fiber network including an optical splitter for connecting the main station to the subsidiary stations. The main station includes a signal communication circuit for conducting communication with the subsidiary stations at a first transmission speed or a second transmission speed and a controller for measuring a transmission distance or a transmission period of time between the main station and each subsidiary station. Based on a result of the measurement, the controller selects a transmission speed to conduct the communication between the main station and the subsidiary station.

There is also provided a PON system in which the controller of the main station measures a transmission distance or a transmission period of time between the main station and each subsidiary station. If a result of the measurement is a predetermined value, the communication between the main station and each subsidiary station is conducted by replacing the first transmission speed with the second transmission speed.

Moreover, there is provided a PON system in which the second transmission speed is more than the first transmission speed, and if the transmission distance or the transmission period of time between the main station and the subsidiary station is equal to or less than a predetermined value as a result of the measurement, the communication is conducted at the second transmission speed.

In the PON, by changing the transmission bit rate according to the transmission distance of the optical section of each user, the distance between a user (ONU) which can be accommodated and a carrier station (OLT), namely, a dynamic range which can be covered by a single station can be expanded. It is also possible to provide a configuration of the PON and a method of operating the same in which by suppressing the transmission bit rate when the transmission distance and/or the transmission speed are/is long, power consumed by the communication apparatus can be lowered. Since expensive constituent components necessary for the high-speed transmission are not required, the system cost is not increased. If the transmission distance and/or the transmission speed are/is short, the communication is carried out at a higher transmission speed, and hence an increased number of users can be accommodated.

Other objects, features and advantages of the invention will become apparent from the following description of the embodiments of the invention taken in conjunction with the accompanying drawings.

DESCRIPTION OF THE EMBODIMENTS

Referring now to the drawings, description will be given in detail of structure and operation of a PON according to the present invention, specifically, in a situation wherein the PON includes the GPON stipulated by ITU-T Recommendation G.984 and the 10GPON handling data at a transmission speed which is four times that of the GPON and which will be expectedly introduced in the future.

Figure 1:
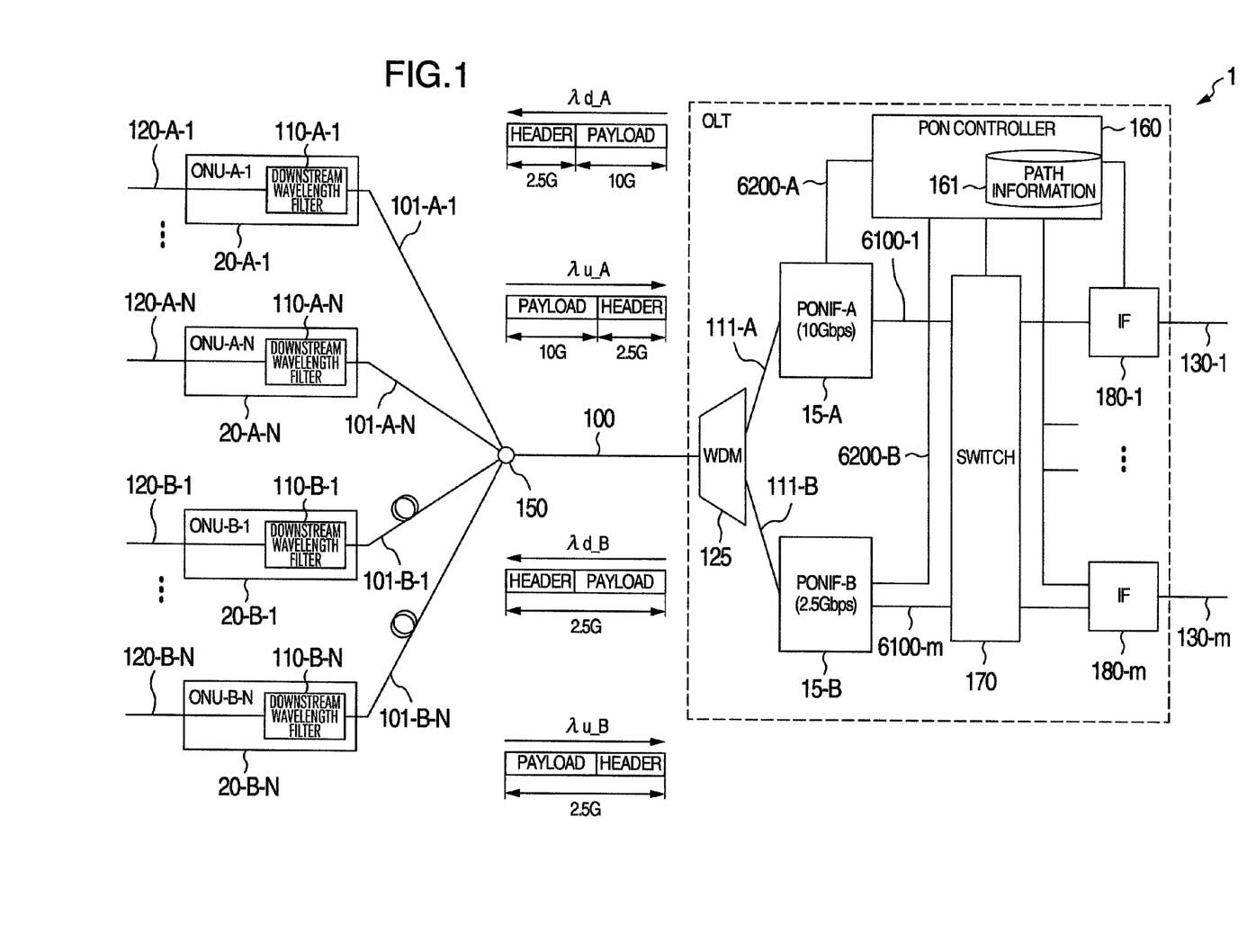
FIG. 1 is a block diagram showing an example of structure of an optical access network employing a PON.

FIG. 1 shows an example of structure of an optical access network employing the PON.

This network is configured on assumption that variable data is processed by use of a time-division multiplexing scheme as in the GPON. Data (payload) is communicated between an OLT 10 and each ONU 20 at a transmission speed of 2.5 Gbps (precisely, 2.48832 Gbps, but will be abbreviated as 2.5 Gbps hereinbelow) in the GPON and 10 Gbps (precisely, 9.95328 Gbps, but will be abbreviated as 10 Gbps hereinbelow) in the 10GPON. Headers are communicated between the OLT 100 and each ONU 20 at a transmission speed of 2.5 Gbps in the GPON and the 10GPON. Downstream transmission signals have a wavelength of λd (1.5 micrometers (μm)) and upstream transmission signals have a wavelength of λu (1.3 μm). However, since the wavelength multiplexing is adopted in the GPON and the 10GPON, which will be described later, it is also possible that the downstream and upstream signals have mutually different wavelengths (the wavelengths used in the GPON are indicated as λuA and λdA and those used in the 10GPON are indicated as λuB and λdB in FIG. 1). The numeric values of these transmission speeds and wavelengths are only examples, and the present invention is not restricted by these values.

In the PON 1 of the present invention which is similar in structure to the conventional PON, an Optical Line Termination (OLT) 10 is connected to a plurality of Optical Network Units (ONU) 20 via basic trunk optical fiber 100, a splitter 150, and branch optical fiber lines 101. The OLT 10 includes a PON Interface-A (PONIF-A) (15-A) to execute termination processing for the 10GPON, a PONIF-B (15-B) to execute termination processing for the GPON, a switch 170 and communication interfaces 180 for each PONIF to communicate terminated signals (data including an Internet Protocol (IP) packet and the like) with a higher-level communication network, such as access and/or core network, and a PON controller 160 to supervise overall operations of the OLT. A database 161 is a storage to keep therein various setting information pieces such as setting information pieces of the switch 170 and those of control regarding paths to communicate signals therethrough. The PONIF-A (15-A) is a module to serve a function corresponding to that of the OLT in the 10GPON and supervises a plurality of ONU 20-A operating at 10 Gbps, for example, to initialize each ONU 20-A. In cooperation with the controller 160, the PONIF-A (15-A) carries out Dynamic Bandwidth Control (DBC) and manages various states in the system. The PONIF-B (15-B) is a module to serve a function corresponding to that of the OLT in the GPON and supervises a plurality of ONU 20-B operating at 2.5 Gbps, for example, to initialize each ONU 20-B. In cooperation with the controller 160, the PONIF-B 15-*b* carries out the DBC and manages various states in the system.

Signals from the respective PONIF (15-A) and (15-B) are time-division or wavelength division multiplexed through optical fiber lines 111 and a multiplexer 125 and are fed to basic trunk fiber 100 to be transmitted via the splitter 150 and branch fiber lines 101 to the respective ONU 20-A and 20-B. Conversely, signals from the respective ONU 20-A and 20-B are optically multiplexed through the trunk fiber 100 as in the conventional PON. The multiplexed signals are sent via the multiplexer WDM 125 and the optical fiber lines 111 to the respective PONIF (15-A) and (15-B), which execute the termination processing for the signals to output the resultant signals to a access/core network.

As also determined by the ITU-T Recommendation, the PON is generally configured such that the OLT 10 performs basic system control to supervise the respective ONU 20. Although description of detailed structure of each ONU 20 will be avoided, the system includes ONU-A (20-A) to operate at 10 Gbps for the 10GPON and ONU-B (20-B) to operate at 2.5 Gbps for the GPON. Each ONU includes a wavelength filter 110 which is disposed, as already implied in the description, to prevent an erroneous operation caused by light which has a undesired wavelength and which is incident thereto when the 10GPON and the GPON operate based on the wavelength multiplexing using mutually different wavelengths. The ONU-A and the ONU-B may be utilized in either one of two ways. That is, each subscriber installs both of ONU-A and ONU-B or one ONU capable of selecting transmission speeds for ONU-A and ONU-B (the transmission speed is changed for each thereof). In the description of the present specification, both types of ONU is simultaneously disclosed for easy understanding of the present invention.

When the operation is started, the PON 1 of the present invention operates at a transmission speed of 2.5 Gbps. After it is determined that the transmission distance between the OLT (PONIF 15) and the ONU 20 is short as a result of the ranging operation and the operation can be sufficiently carried out for the communication at a transmission speed of 10 Gbps, the operation speed of the PON 1 is then set to 10 Gbps, which will be described in detail later. That is, 10 Gbps is assigned to the OLT 1 and each ONU 20 in short-distance communication, and 2.5 Gbps is assigned thereto in long-distance communication. There is hence provided a configuration and an operation method of the PON in which the number of subscribers is increased by expanding the distance between the users (ONU) to be accommodated and the carrier station (OLT), i.e., the dynamic range which can be covered by one station and in which the consumption power of the communication apparatus is lowered by reducing the transmission bit rate when the transmission distance is long.

As the access/core networks of the PON 1 of the present invention, there are connected via the communication lines 130 communication networks provided by communication carriers, e.g., ethernet (registered trademark) and SONET/Synchronous Digital Hierarchy (SDH). As lower-level modules of the respective ONU 20, there are connected via the communication line 120 user devices, e.g., PC and communication terminals (for telephone, data, and images). Since the access/core networks and the lower-level module are similar to those of the conventional PON and are hence not shown.

Figure 2:
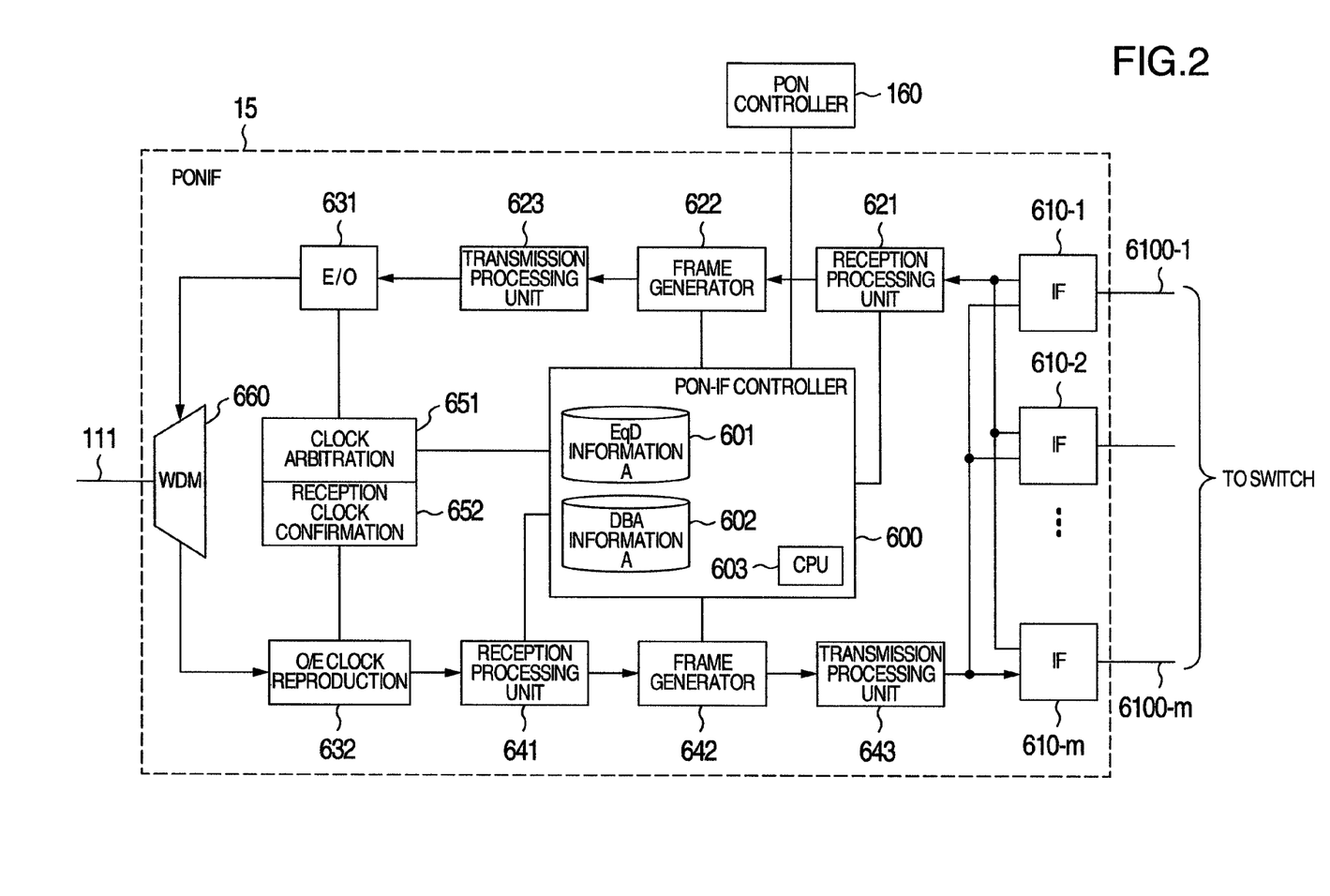
FIG. 2 is a block diagram showing an example of structure of an optical line terminator of the PON.

FIG. 2 shows an example of structure of the PONIF disposed in the OLT 10 to implement a multiplexing termination function of the PON.

The PONIF 15 includes a Wavelength Division Multiplexer (WDM) 660 as an interface with optical fiber 111-A on the side of the PON section. In this specification, the PON section is also referred to as a Network-Network Interface (NNI) section indicating a section from the OLT 10 (WDM 125) via the trunk fiber 100, the splitter 150, the branch fiber 101 to each ONU (20-A, 20-B). The WDM 660 is a filter to demultiplex the wavelength (e.g., λuA of FIG. 1) of the upstream signal (from the ONU to the OLT) from the wavelength (e.g., λuA of FIG. 1) of the downstream signal (from the OLT to the ONU). The PONIF 15 also includes interfaces 610 to communicate, via the access/core networks, the communication lines 130, the communication interfaces 180, and the switch 170, signals provided by communication carriers such as ethernet, SONET/SDH, T1, and E1. The PONIF 15 conducts various operations which correspond to the OLT and which are similar to those of the conventional PON by use of the respective functional modules arranged between the WDM 660 and the respective interfaces 610, which will be described below.

When the system uses, for example, ethernet, the PONIF 15 processes downstream signals as follows. Each of the interfaces 610-1 to 610-*m* executes, when a signal is received, synchronization processing and conducts termination processing of the protocol for the signal. A reception processing unit 621 determines, based on header information of a downstream frame thus received, a destination of the frame. Concretely, the reception processing unit 621 determines whether information in the frame is the ONU of the destination or information to be processed in the PONIF (OLT) 15. Also, depending on the destination information and the type of the received data, the reception processing unit 621 executes header processing such as conversion, assignment, and deletion of address information. The destination information includes path or route information such as information for Medium Access Control (MAC) and information for Internet Protocol (IP) as well as logical path information such as a Virtual Local Area Network (VLAN) tag and a Multi Protocol Label Switching (MPLS) label. If the information is to be internally processed by the PONIF (OLT) 15, the information is transferred to a CPU 603 of a PON-IF controller 600. If the information is to be transmitted to the ONU, the information is transferred to a downstream frame generator 622. Based on the frame received from the reception processing unit 621 and the information from the controller 600, the generator 622 generates a downstream distribution frame. The information from the controller 600 includes information stipulated by the recommendation such as information of Dynamic Bandwidth Assignment (DBA) to be notified to each ONU and control information (a Physical Layer Operations, Administration and Maintenance (PLOAM) message in G.984.3) for control and management in the PON section. The information is ordinarily inserted in the header of a downstream frame to be transmitted to each ONU 20. A transmission processing unit 623 buffers in a buffer the frame generated by the downstream frame generator 622. According to priority of the frame information, a state and processing capacity of the ONU to receive the frame, and the like, the transmission processing unit 623 reads the frame from the buffer to send the frame to each ONU 20. An Electrical/Optical (E/O) converter 631 converts an electric signal into an optical signal to be communicated in the PON section.

The PONIF 15 processes upstream signals as follows. An optical signal which has an upstream wavelength and which is demultiplexed by the WDM 660 is converted by an Optical/Electrical (O/E) converter 632 into an electric signal to reproduce a transmission clock of an upstream signal. By use of the reproduced clock, a reception processing unit 641 identifies the data of the received frame based on header information of the received frame as in the downstream frame processing, namely, determines whether the data is data to be transferred to a access/core network or data to be terminated in the PON controller 600. Based on the header information of the received frame, the reception processing unit 641 executes addition, conversion, and deletion of destination information according to the setting of path information. By use of information pieces from the controller 600 and the reception processing unit 641, an upstream frame generator 642 generates a header and a payload of a frame to be transferred to a access/core network and transfers the header and the payload to a transmission processing unit 643. The transmission processing unit 643 buffers the generated frame in a buffer. According to information pieces such as priority of frame information and a state and processing capacity of the ONU to receive the frame, the transmission processing unit 643 reads the frame from the buffer to transmit the frame via the interface 610, the switch 170, and the communication interface 180 to the access/core network.

In the configuration, although details will be described later, before the reception processing unit 641 receives the upstream frame from each ONU 20, the clock reproduced by the O/E converter 632 is checked to confirm whether or not the clock is received at appropriate timing according to the timing indicated at transmission of the downstream frame to each ONU 20. Specifically, the timing to be indicated at transmission of the downstream frame is kept in the DBA information A 602 indicating band allocation information in the controller 600 and Equalization Delay (EqD) information A 601 indicating information regarding distance between each ONU and the PONIF 15. Whether or not the timing is correct is confirmed as follows, and required adjustment is also carried out. Concretely, according to the configuration, (1) on the basis of indicated timing from the controller 600, a clock adjuster 651 adjusts the downstream clock of the E/O converter to thereby transmit the downstream frame. Moreover, (2) on the other hand, a reception clock confirming unit 652 compares the reception (reproduced) clock with the DBA information 602 to achieve confirmation to determine whether or not the reception timing is correct. (3) at this point of time, if the timing is shifted from the value beforehand stored, the EqD information A kept in the controller 600 is updated and then the EqD information addressed to the pertinent ONU is inserted in the downstream header to resultantly modify the logical distance.

As determined by ITU-T Recommendation, the OLT 10 conducts the basic system control in the PON in general. As described above, each of the PONIF 15 of the present invention serves the functions of the 10GPON and the GPON. The PONIF controller 600 arranged in each PONIF 15 carries out control corresponding to the OLT of the 10GPON and the GPON. According to configuration of the present invention, the PON controller 160 in the OLT 10 and each controller 600 are connected via a signal line 6200 to each other to notify the PON controller 160 of ONU ranging information determined between each PONIF 15 and each ONU 20, PON control information determined according to standards such as PLOAM, OMCI, and communication and device alarm. Details will be described below. The controllers 160 are configured to manage information from the respective PONIF 15 or to exchange or share the information therebetween. The controller 160 determines the transmission bit rate between the ONU and the OLT 10 according to the PON section of the present invention. Also, the controller 160 indicates each PONIF 15 to set up the ONU 20 between the respective PONIF 15 and the respective ONU 20 and indicates a PONIF changeover for accommodation of the ONU. The controller 160 carries out the operation of the PON to provide a PON in a configuration and an operation method of the PON in which the distance between the users (ONUs) to be accommodated and the carrier station (OLT) is expanded by changing the transmission bit rate according to the transmission distance of the optical section for each user and in which the consumption power of the communication apparatus is lowered by reducing the transmission bit rate when the transmission distance is long.

Figure 3:
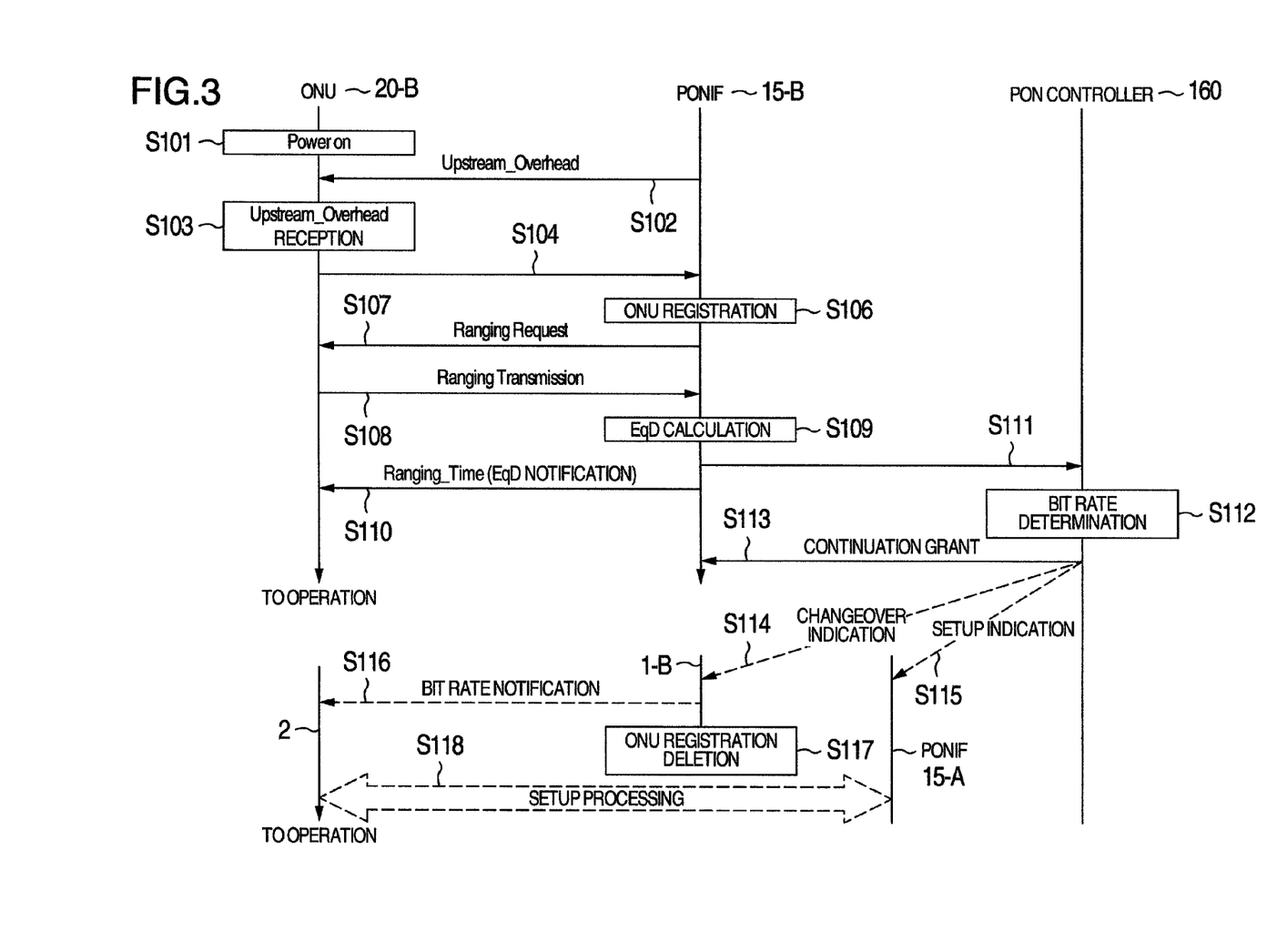
FIG. 3 is a sequence chart showing an example of an ONU setup processing procedure in the PON.

FIG. 3 is a sequence chart showing a processing procedure for the PON to set up an ONU.

The PON of the present invention starts operation at 2.5 Gbps. To set up the ONU, the ONU 20 corresponding to the ONU-B (20-B) and the PONIF-B (15-B) of the OLT 10 carry out the following operation to set up the PON corresponding to the GPON stipulated by ITU-T G.984.3. This sets the control operation of the PON and the operation thereof is initiated. The PON of the present invention first starts operation at a low speed and then changes the speed to a high speed according to the necessity. The setup procedure prescribed by ITU-T G.984.3, which will be described below, is only an example. The present invention is not restricted by the procedure of the example.

(1) When powered (S101), the ONU-B (20-B) receives an upstream overhead message periodically transmitted from the PONIF-B (15-B) (S103). The message contains information to be included in a frame header thereof when the ONU-B (20-B) sends an upstream frame to the PONIF-B (15-B).

(2) The ONU-B (20-B) sends the frame including the information to the PONIF-B (15-B) (S104). On receiving the frame, the PONIF-B (15-B) recognizes presence of a new ONU-B (20-B) and determines and registers a sequence number (SN) stipulated by ITU-T and an ONU identifier (S106).

(3) When the new ONU-B is registered, the PONIF-B (15-B) executes ranging process to measure the distance to the ONU in the PON section. Specifically, the PONIF-B (15-B) transmits a ranging request signal to the pertinent ONU-B (20-B) (S107). Thereafter, the PONIF-B (15-B) receives a ranging transmission signal, which the ONU-B (20-B) sends in response to reception of the request within a prescribed period of time relative to the signal reception (S108). The PONIF-B (15-B) records a period of time from the transmission of the request signal to the reception of the transmission signal as a communication round-trip period of time required for a signal to go to ONU-B (20-B) and to come back therefrom. In order that the communication round-trip period of time viewed from the PONIF 15 is fixed for all ONU, a response wait time (EqD) in the apparatus is set to each ONU 20 (S109). The EqD is notified using a downstream signal to be set to the ONU 20 (S110). The EqD is also notified to the PON controller 160 to change the transmission bit rate in the PON of the present invention (S111).

(4) In the ONU initial setup procedure, there are used the PONIF-B (15-B) and the ONU-B (20-B) corresponding to a downstream transmission rate of 2.5 Gbps. On receiving the EqD, the PON controller 160 determines, based on the notified EqD, a transmission bit rate to be used in the operation of the PON thereafter (S112). Concretely, if the EqD is more than a predetermined value and the ONU 20 is at a position apart from the PONIF 15 (or the OLT 10) by a long distance equal to or more than a predetermined distance, the controller 160 determines, on the basis of transmission characteristics represented by a wavelength dispersion and a Signal-to-Noise (S/N) ratio, that the signal transmission at a high bit rate cannot maintain the communication quality. Hence, the controller 160 notifies a continuation grant to the PONIF-B (15-B) to conduct the operation of the PON by continuously using the PONIF-B (15-B) and the ONU-B (20-B) (S113).

If the system enters the operative state with the low-bit rate kept unchanged, the PON controller 160 sets a communication path to the PONIF-B (15-B). Specifically, the controller 160 indicates a distribution path in the switch 170 in the apparatus and a header conversion method in the PONIF. Detailed operation is similar to that to be conducted after a change to a high transmission bit rate. Hence, description thereof will be separately given when the high-bit rate communication operation shown in conjunction with FIG. 4 is explained.

(5) On the other hand, if the EqD is less than a predetermined value and the ONU 20 is at a position apart from the PONIF 15 (or the OLT 10) by a short distance equal to or less than a predetermined distance, the controller 160 determines, on the basis of transmission characteristics represented by a wavelength dispersion and a Signal-to-Noise (S/N) ratio, that the signal transmission at a high-bit rate can maintain the communication quality. Hence, the controller 160 indicates the PONIF-B (15-B) to initiate the operation of the PON by changing the use of the PONIF-B (15-B) and the ONU-B (20-B) to the use of the PONIF-A (15-A) and the ONU-A (20-A) (S114, S115).

(6) After receiving the changeover indication (S114), the PONIF-B (15-B) issues a bit rate changeover notification to the ONU-A (20-A) to be used as a new unit in the operation (S116). As beforehand described above, the ONU-A and the ONU-B may be utilized in either one of the two ways. That is, each subscriber installs both of the ONU-A and the ONU-B or one ONU capable of selecting transmission speeds for ONU-A and ONU-B (the transmission speed is changed for each thereof). The use of the units will be appropriately determined by the ONU side having received the bit rate changeover notification. The PONIF-B (15-B) deletes the registration of the ONU-B (20-B). The PONIF-A (15-A) initiates the setup of the ONU-A (20-A) (S118).

Figure 4:
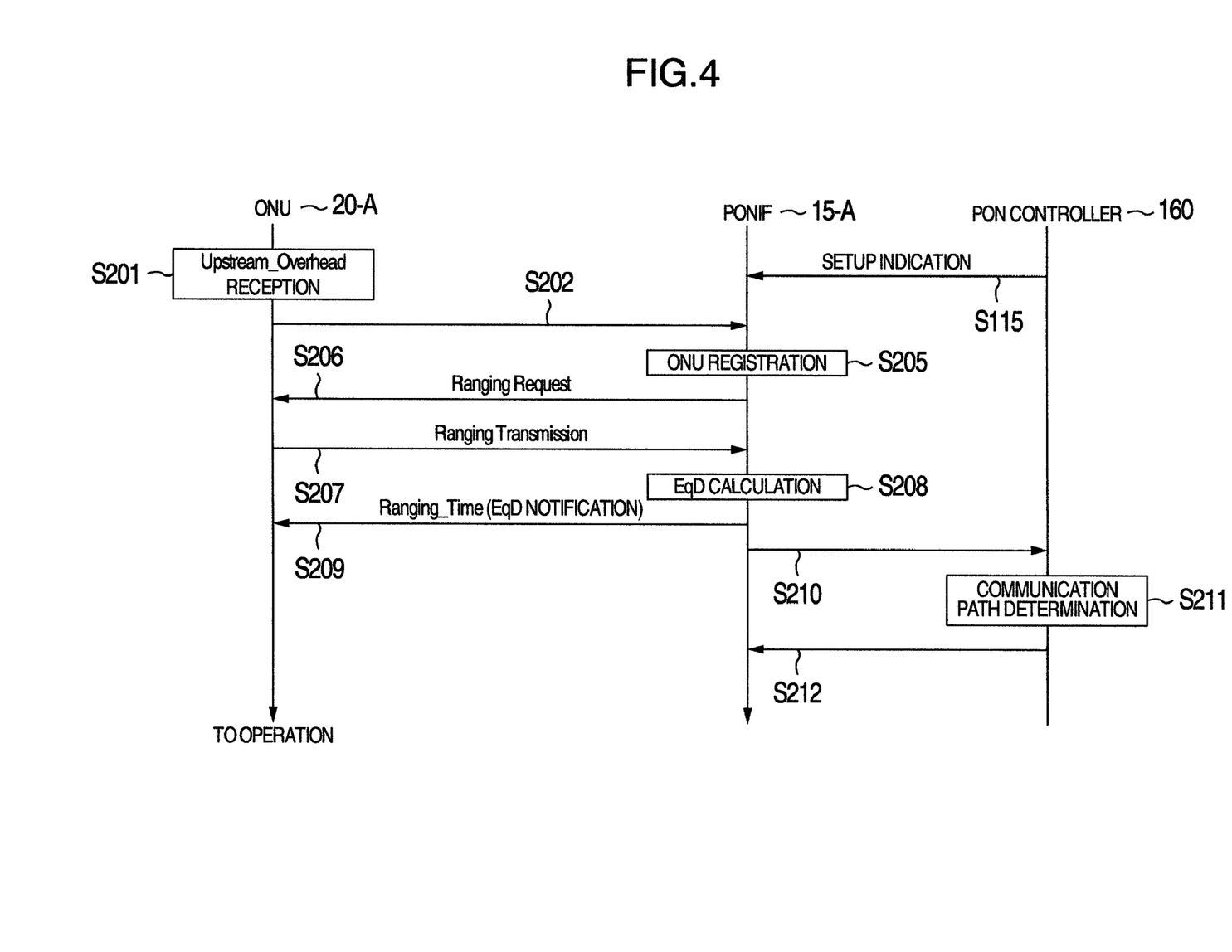
FIG. 4 is also a sequence chart (continuation) of the example of an ONU setup processing procedure in the PON.

FIG. 4 shows a sequence chart showing a continuation of the ONU setup procedure. In the procedure, the use of the PONIF-B (15-B) and the ONU-B (20-B) is changed to the use of the PONIF-A (15-A) and the ONU-A (20-A) (S114, S115) in the operation of the PON.

(1) Also the ONU-A (20-A), if powered, receives an upstream overhead message periodically sent from the PONIF-A (15-A) (S201). Like the ONU-B (20-B), the ONU-A (20-A) transmits the frame to the PONIF-A (15-A) (S202) to thereby make the PONIF-A (15-A) recognize presence of the new ONU-A (20-A). Like the PONIF-B (15-B) above, the PONIF-A (15-A) determines and registers a sequence number (SN) stipulated by ITU-T and an ONU identifier (S205). Concretely, as above, the registration may be carried out in a procedure stipulated by ITU-T or in a method in which the information deleted in step S117 of FIG. 3 is taken over via the PON controller 160.

(2) When the new ONU-B is registered, the PONIF-A (15-A) executes ranging process to measure the distance to the ONU in the PON section. This is because that only a slight difference in the installation conditions of the ONU, the PONIF, and the optical fiber between the PONIF-A (15-A) and the PONIF-B (15-B) causes a change in, for example, the EqD value and resultantly makes it difficult to maintain the signal reception timing, or unless the distance adjustment is precisely conducted, it is difficult to maintain the communication quality on the basis of the transmission characteristics represented by the wavelength diversion and the S/N ratio. However, the specific procedure is similar to that described above. The PONIF-A (15-A) transmits a ranging request signal to the pertinent ONU-A (20-A) (S206). Thereafter, the PONIF-A (15-A) receives a ranging transmission signal which the ONU-A (20-A) sends, in response to reception of the request, within a prescribed period of time relative to the signal reception (S207). The PONIF-A (15-A) records a period of time from the transmission of the request signal to the reception of the transmission signal as a communication round-trip period required for a signal to go to ONU-A (20-A) and to come back therefrom. In order that the communication round-trip period viewed from the PONIF 15 is fixed for all ONU, a response wait time (EqD) in the apparatus is set to each ONU 20 (S208). This operation differs from that described above only in time adjusting precision. The EqD is notified using a downstream signal to be set to the ONU 20 (S209).

(3) The PONIF-A (15-A) also transmits, to the PON controller 160, information required to determine a communication path in the OLT 10 (S210). Concretely, the PONIF-A (15-A) also transmits ONU information including one of or a plurality of control managing parameters in the PON section, i.e., ONU-ID, Alloc-ID, Port-ID required for the PONIF to manage the pertinent ONU and path information to be used by the ONU. These parameters are used by the PON controller to control the switch 170 for each communication bit rate. As already described above, when the system enters the operation state with the low transmission rate kept unchanged, the PONIF-A (15-A) also transmits, to the controller 160, information required to determine a communication path in the OLT 10 (not shown in FIG. 3). Next, Although description will be given primarily of operation of the OLT 10 for the 10GPON employing the PONIF-A (15-A), operation thereof for GPON using the PONIF-B (15-B) is similarly carried out.

Upon receiving the communication bit rate information of the ONU-A (20-A) from the PONIF-A (15-A), the PON controller 160 sets control parameters of the switch 170 and the communication interface 180 to distribute, to the PONIF-A (15-A), the downstream signal which is addressed to the ONU-A and which is received via either one of the pairs of the communication line 130 and the communication interface 180 from an access/core network (S211). The controller 160 also notifies results of the setting operation to the PONIF-A (15-A) (S212) and conducts a control operation to forward the downstream signal to the pertinent ONU-A.

Figure 5:
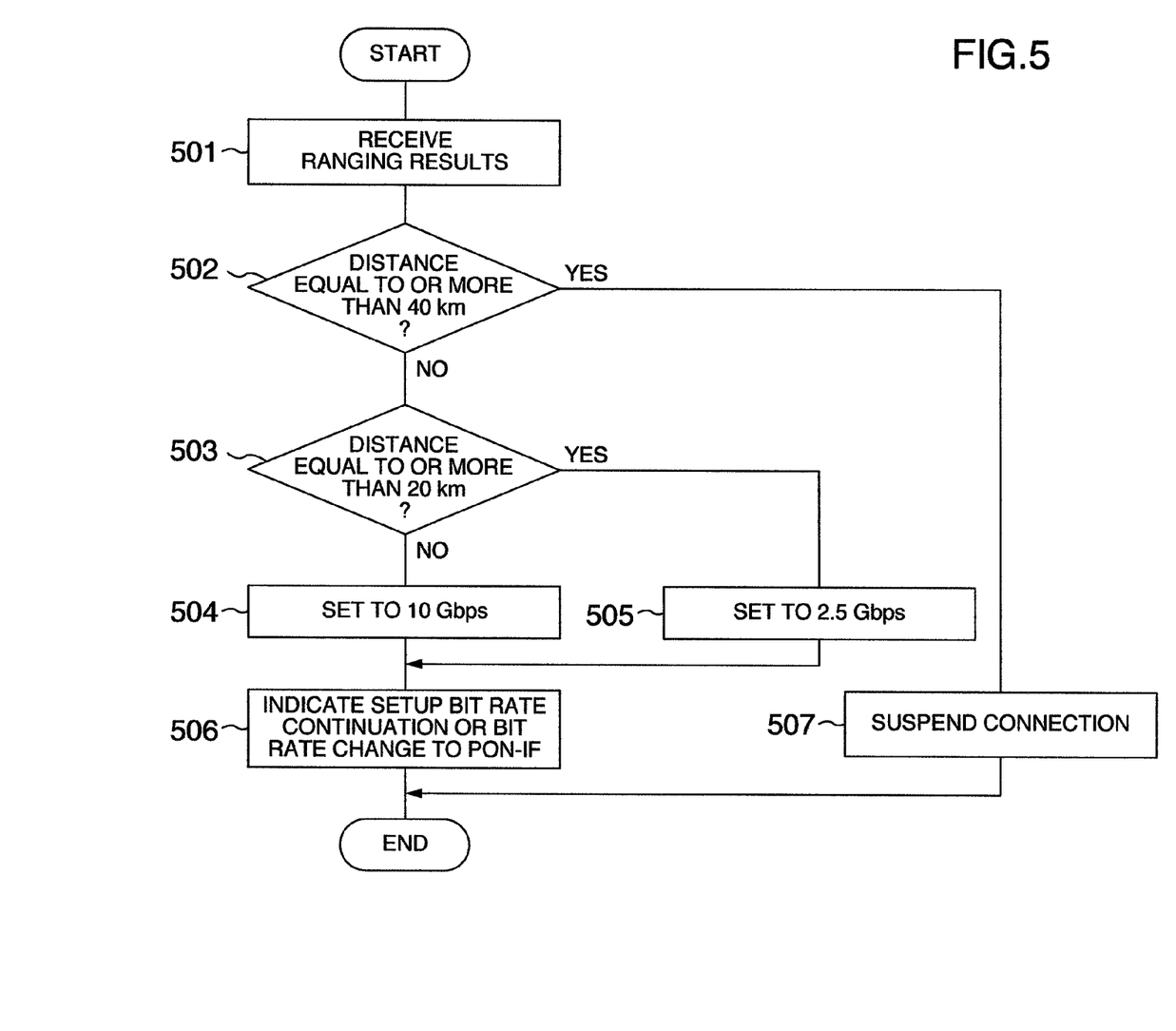
FIG. 5 is a flowchart showing an example of operation of the ONU setup processing procedure in the PON.

FIG. 5 is a flowchart showing an example of an ONU setup processing procedure in the PON to determine a transmission bit rate to be used by the new ONU 20.

Specifically, this is an example of the bit rate determining procedure (S112) shown in FIG. 3. On receiving the EqD determined through the ranging operation by the PONIF-B (15-B) (501), the PON controller 160 selects, according to the distance between the ONU-B (20-B) and the PONIF-B (15-B), a transmission bit rate to be used by the ONU 20 as described above. Values of the distance and the transmission bit rate which will be described below are only examples. It is to be appreciated that the values are appropriately changed according to parts or components used in the ONU and OLT in the PON and the communication quality required by the PON.

(1) If the distance is equal to or more than the distance allowed in the PON system (40 Km in this embodiment), the communication quality cannot be maintained, and hence the connection is suspended (502, 507).
(2) If the distance is beyond a predetermined range of distance (equal to or more than 20 Km and less than 40 Km in this embodiment), the communication quality cannot be maintained in the operation at a high transmission bit rate. Therefore, the PONIF-B (15-B) and the ONU-B (20-B) employed in the setup of the PON are continuously used to conduct transmission at a low transmission bit rate of 2.5 Gbps (503, 505, 506).
(3) If the distance is less than the lower limit of distance (20 Km in the embodiment), it is assumed that the communication quality can be maintained in the transmission at a high transmission bit rate. Hence, the PONIF-B (15-B) and the ONU-B (20-B) employed in the PON setup are changed to the PONIF-A (15-A) and the ONU-A (20-A) to conduct communication at a high transmission bit rate of 10 Gbps (503, 504, 506).

In the configuration of the embodiment, the processing procedure of step S113 and subsequent steps of FIG. 3 and that of FIG. 4 are carried out in step 506 to select and/or to change the ONU 20 and the PONIF 15 as described above.

Figure 6:
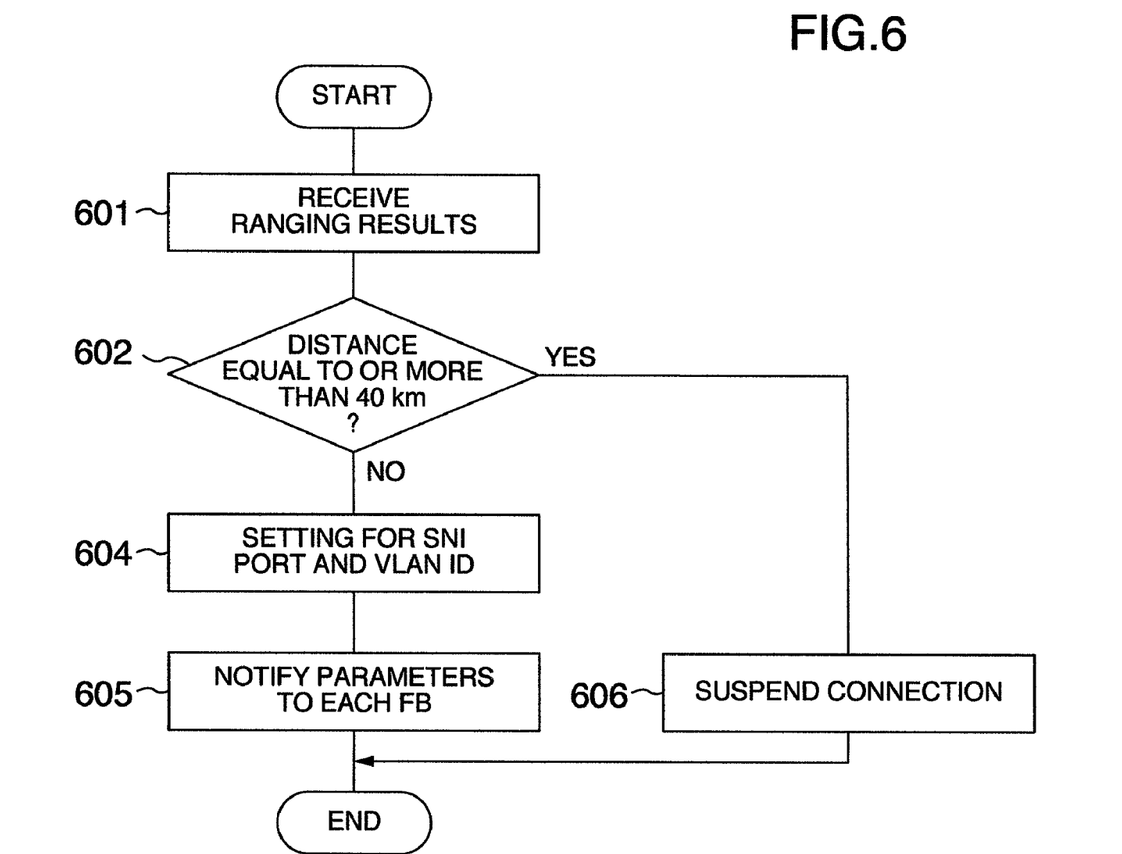
FIG. 6 is also a flowchart (continuation) of the example of operation of the ONU setup processing procedure in the PON.

FIG. 6 is a flowchart showing also an example of a ONU setup processing procedure in the PON. This specifically shows an example of the communication path determining procedure (S211) of FIG. 4 to set a communication path which the new ONU 20 uses in the OLT 10.

(1) In the configuration of the embodiment, a transmission distance check is again carried out as in the bit rate determining procedure described above. If the distance is equal to or more than the distance designated for the PON system (40 Km in the embodiment), the communication quality cannot be maintained and hence the connection is suspended (602, 606). This procedure is disposed to secure reliability of the system and hence may be dispensed with.
(2) If the transmission distance is appropriate, the system determines a communication path to conduct communication from the pertinent ONU 20 via the interface 610 of the PONIF 15, the switch 170, and the communication interface 180 for an external network.

To set the communication path, the system uses setting parameters including identifiers to be assigned to a packet (data/signals) passing through the OLT such as an identifier (SNI port) of the interface 610 of the PONIF 15, a VLAN tag (VLANID or VID, hereafter), an MPLS tag, and an internal header routing tag (604). In the configuration, the path setting parameters to set a path in the OLT are stored in the path information data base 161 arranged in the PON controller 160. When the setting parameters are notified to the respective function blocks (FB), the system sets, for example, a path for each packet identifier in the switch 170 and then conducts setting (conversion, assignment, deletion, transmission) of the identifiers to packets in the interface 610 of the PONIF 25 and the communication interface 180 (605).

These parameters such as the VLANID are only examples. There may be employed any parameter only if the parameter forms a communication path for data/signals in, for example, the switch 170 between the ONU 20 and a access/core network in the OLT 10. To set parameters, there exists no restriction for the communication protocol.

Figure 7:
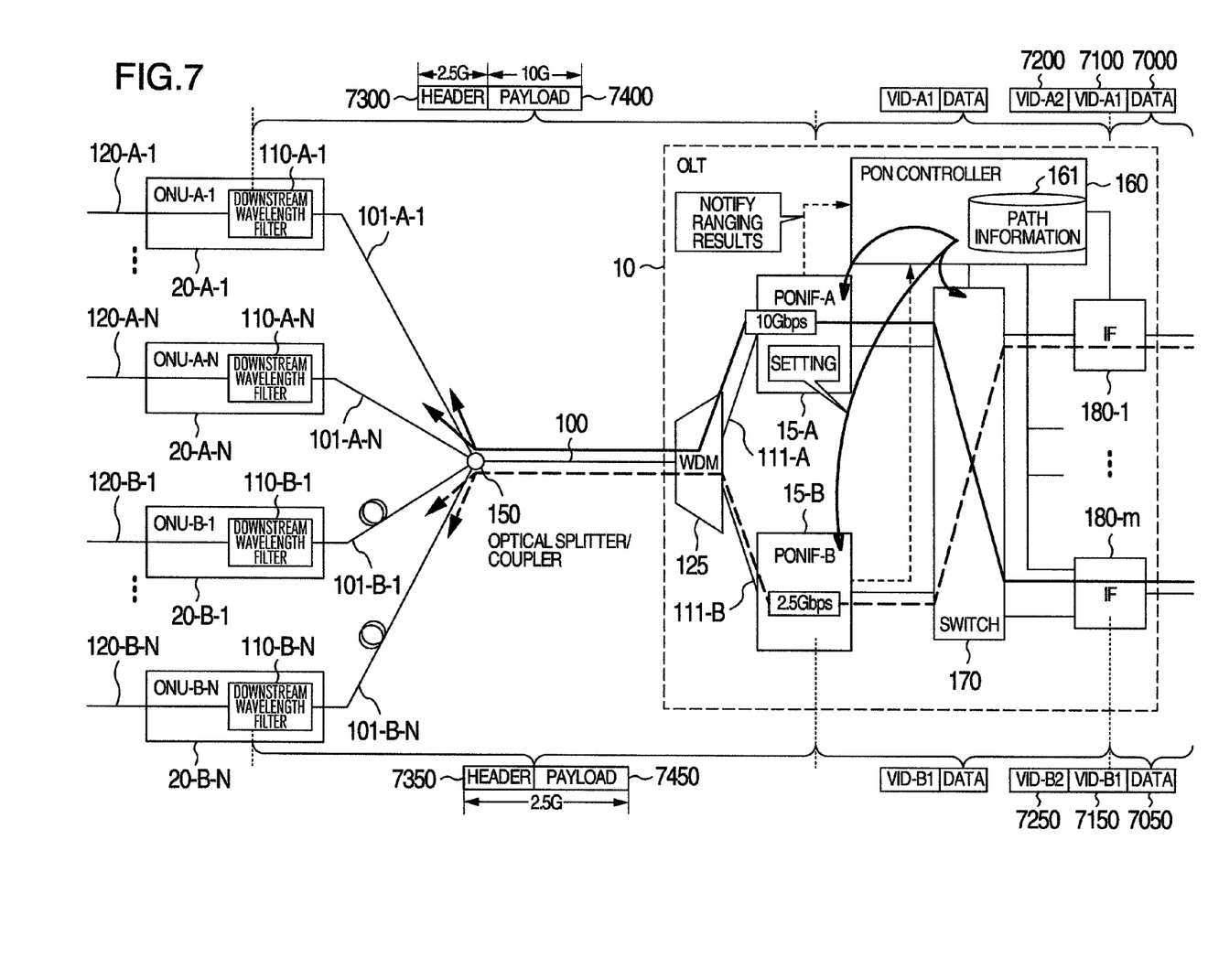
FIG. 7 is a block diagram showing a network configuration to explain an example of operation of the PON.

FIG. 7 shows a network layout to explain an example of operation of the PON according to the present invention in which the PON system is configured in almost the same way as for the PON shown in FIG. 1.

Description will now be given of an operation example of the PON system in which after a new ONU 20 is set up, path setting control to set a path in the OLT 10 is conducted using a VLAN tag, and then the ONU 20 communicates data/signals with an access/core network.

In FIG. 7, broken lines indicate signal flows in the PON as follows. (1) as a result of the ranging operation in the ONU setup procedure, it is determined to conduct communication using the ONU-B-1 (20-B-1) at a low transmission bit rate (2.5 Gbps in the embodiment) and (2) a communication path setting is carried out such that the OLT 10 transmits a signal from a access/core network via the communication interface 180-1, the switch 170, and the PONIF-B (15-B) to the ONU-B-1 (20-B-1).

Also, solid lines indicate signal flows in the PON as follows. (3) as a result of the ranging process in the ONU setup procedure, it is determined to conduct communication using the ONU-A-N (20-A-N) in place of the ONU-B-N (20-B-N) at a high transmission bit rate (10 Gbps in the embodiment) and (4) a communication path setting is carried out such that the OLT 10 transmits a signal from an access/core network via the communication interface 180-*m*, the switch 170, and the PONIF-A (15-A) to the pertinent ONU-A-N (20-A-N).

The database 161 in the PON controller 160 has accumulated therein the path setting information pieces prescribed by the communication path setting procedure described in conjunction with step S211 of FIG. 4 and FIG. 6. By setting these information pieces to the communication interface 180, the switch 170, and the PONIF 15 of the OLT 10, the signals are transmitted from the access/core network to the predetermined ONU 20 at the determined transmission bit rate.

Specifically, (1) a VID-A1 7100 and a VID-A2 7200 are added to data 7000 received by the communication interface 180-*m* from the access/core network and the data is sent to the switch 170. (2) The switch 170 transmits the data to the PONIF-A (15-A) according to the VID-A2 7200. (3) The PONIF-A (15-A) identifies, based on the VID-A1 7100, the ONU-A-N (20-A-N) to which the data is to be transmitted, converts the data into a packet including a header 7300 for 2.5 Gbps signal transmission in the PON section and a payload 7400 for data to be transmitted at 10 Gbps, and then sends the resultant packet to the PON section including the optical fiber 100. Similarly, (1) a VID-B1 7150 and a VID-B2 7250 are added to data 7050 received by the communication interface 180-1 from the access/core network and the data is sent to the switch 170. (2) The switch 170 transmits the data to the PONIF-B (15-B) according to the VID-A2 7200. (3) The PONIF-B (15-B) identifies, based on the VID-B1 7150, the ONU-B-1 (20-B-1) to which the data is to be transmitted, converts the data into a packet including a header 7350 for 2.5 Gbps signal transmission in the PON section and a payload 7400 for data to be transmitted at 10 Gbps, and then sends the resultant packet to the PON section including the optical fiber 100. Up to this point, description has been given of a processing procedure of a downstream signal. An upstream signal is processed in a procedure almost reverse to the processing procedure of the downstream signal.

Figure 8:
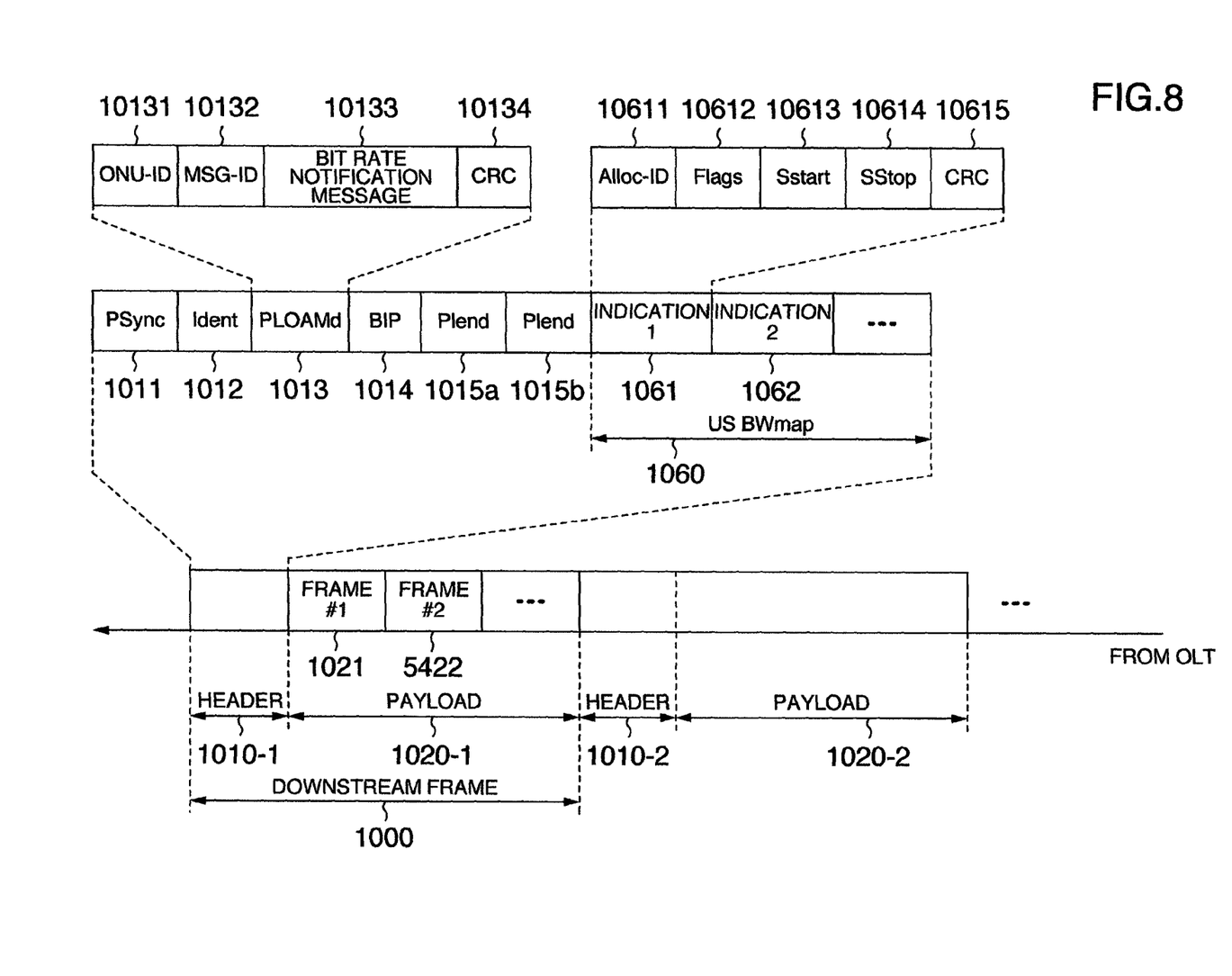
FIG. 8 is a diagram showing an example of frame layouts of signals communicated in a PON section.

FIG. 8 shows an example of frame layouts of signals communicated in the PON section, specifically, transmission frames used for bit rate notification (S116) described in conjunction with FIG. 3.

The PON 1 of the present invention is configured on the basis of the GPON prescribed in ITU-T Recommendation, and the transmission frames to be communicated in the PON section are also configured generally conforming to the recommendation, but the present invention is not restricted by the examples.

A downstream frame 1000 includes a header 1010 and a payload 1020. The header 1010 includes signals stipulated by ITU-T Recommendation G984.3, for example, PSync 1011 as a signal pattern to synchronize an optical signal and a signal of an Upstream Bandwidth Map (USBWmap) field to indicate band allocation to each ONU 20 for each transmission cycle.

In the configuration of the PON 1 of the present invention, a bit rate to be used by the ONU is notified to the ONU by use of a PLOAMd field 1013 for which a desired message not stipulated by the recommendation can be defined. The field 1013 is a field disposed to manage the ONU 20 and includes an identifier of the objective ONU 10131, a message identifier of a message type 10132, a message itself 10133, and a Cyclic Redundancy Correction (CRC) field for error correction 10134. In the configuration, information pieces including a transmission bit rate determined by the PON controller 160 and the type of the PONIF 15 for transmission are included in the message field 10133 to be notified to the pertinent ONU 20. Information of the message identifier 10132 can be freely defined. Hence, by use of the field 10132, the required operation is feasible without changing the prescribed structure. Also, even if there exists a PON of a second company which shares the optical fiber, the operation can be conducted without affecting the PON of the second company. As described above, when there are employed PONIFs of mutually different operation frequencies, it is possible to configure the PON in which the operation frequency change notification is also included in the PLOAMd field 1013 to control the wavelength filter 110 disposed in the ONU 20.

Figure 9:
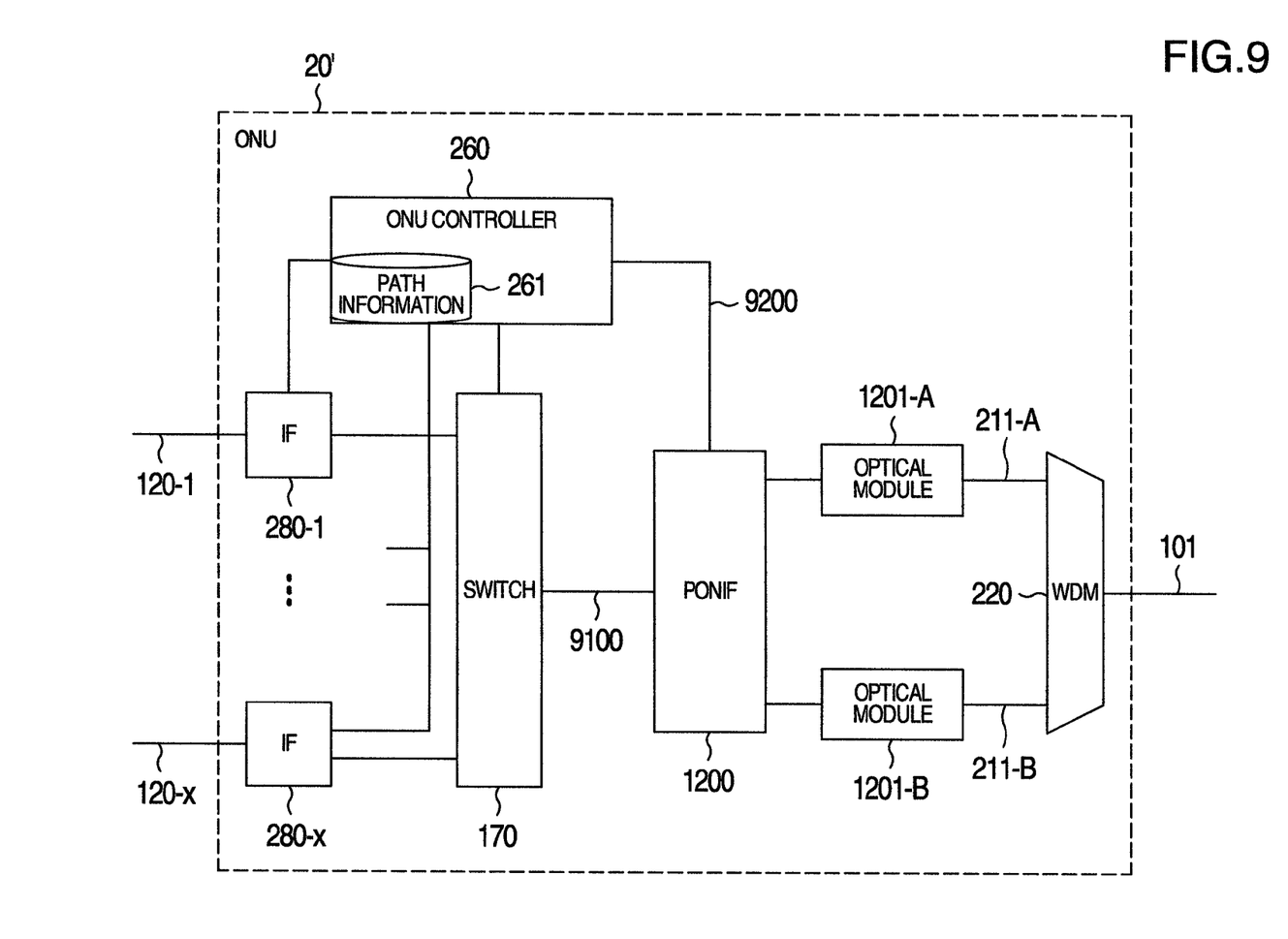
FIG. 9 is a block diagram showing an example of a configuration of an ONU employed in the PON.

FIG. 9 shows an example of a configuration of an ONU employed in the PON. The ONU 20 does not adopt the configuration described above in which a plurality of ONU are arranged for the respective transmission bit rates to oppose to the respective OLT-A/B of mutually different transmission bit rates. In the configuration of FIG. 9, a single PONIF 1200 conducts signal multiplexing and high-speed processing to create frames to communicate with both of the PONIF-A and the PONIF-B such that an output interface for the PON section absorbs the bit rate difference between 2.5 Gbps and 10 Gbps. The PONIF 1200 processes 2.5 Gbps or 10 Gbps electric signals to communicate with the respective OLT 10. The optical signal to be communicated in the PON section considerably varies in characteristics between the 2.5 Gbps transmission and the 10 Gbps transmission. Hence, the PON 1 includes an optical module 1201-A for 10 Gbps transmission opposing to the PONIF-A (15-A) and an optical module 1201-B for 2.5 Gbps transmission opposing to the PONIF-B (15-B) such that a PON controller 260 conducts changeover control for the PONIF 1200 and the optical modules 1201-A and 1201-B. Therefore, the procedure in which the system operates at 2.5 Gbps in the setup phase of the new ONU 20, and when it is determined as a result of a ranging process that the high bit rate is available for transmission, operation is changed to the OLT-A (10-A) to conduct the 10 Gbps transmission is similar to that of the PON described above. Hence, the new ONU setup, the bit rate determination, and the communication path determination (reference is to be made to FIGS. 3 to 6) are also carried out by the PON controller 260 in almost the same way as described above.

The block diagram shown in FIG. 9 is also applicable as a second configuration example of the ONU employed in the PON. There is not employed the configuration described above in which a plurality of PONIF are arranged for the respective transmission bit rates to oppose to the respective ONU-A/B of mutually different transmission bit rates. That is, the single PONIF 1200 conducts signal multiplexing and high-speed processing to create frames for communication with both of the ONU-A and the ONU-B such that the output interface for the PON section absorbs the bit rate difference between 2.5 Gbps and 10 Gbps.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A passive optical network system, comprising:
a main station;
a plurality of subsidiary stations; and
an optical fiber network comprising an optical splitter for connecting the main station to the subsidiary stations, wherein:
the main station comprises
a signal communication circuit for conducting communication with the subsidiary stations at a first transmission speed or a second transmission speed and
a controller for measuring a transmission distance or a transmission period of time between the main station and each of the subsidiary stations;
the controller selects, based on a result of the measurement, a transmission speed to conduct the communication between the main station and each of the subsidiary stations; and
the main station communicates with each of the subsidiary stations at the selected one of the first and second transmission speeds.

2. A passive optical network system, comprising:
a main station;
a plurality of subsidiary stations; and
an optical fiber network comprising an optical splitter for connecting the main station to the subsidiary stations, wherein:
the main station comprises
a signal communication circuit for conducting communication with the subsidiary stations at a first transmission speed or a second transmission speed and
a controller for measuring a transmission distance or a transmission period of time between the main station and each of the subsidiary stations;
each of the subsidiary stations comprises a signal communication circuit for conducting communication with the main station at the first or second transmission speed; and
when the controller of the main station conducts measurement for each of the subsidiary stations at the first transmission speed and if a result of the measurement is a predetermined value, communication between the main station and the subsidiary station is conducted by replacing the first transmission speed with the second transmission speed.

3. A passive optical network system, comprising:
a main station;
a plurality of subsidiary stations; and
an optical fiber network comprising an optical splitter for connecting the main station to the subsidiary stations, wherein:
each of the subsidiary stations comprises either one of a signal communication circuit for conducting communication with the main station at a first or second transmission speed and a signal communication circuit for conducting communication with the main station at the first and second transmission speeds;
the main station comprises
a first subsidiary station interface for conducting communication with the subsidiary stations at the first transmission speed,
a second subsidiary station interface for conducting communication with the subsidiary stations at the second transmission speed, and
a controller connected to the first and second subsidiary station interfaces for conducting control of the main station;
a transmission speed to conduct the communication between the main station and each of the subsidiary stations is selected based on a result of measurement, conducted by the controller, of a transmission distance or a transmission period of time between the main station and each of the subsidiary stations; and
the main station communicates with each of the subsidiary stations at the selected one of the first and second transmission speeds.

4. A passive optical network system according to claim 1, wherein:
the second transmission speed is a transmission speed greater than the first transmission speed; and
communication is conducted at the second transmission speed if the transmission distance or the transmission period of time between the main station and each of the subsidiary stations is equal to or less than a predetermined value as a result of the measurement.

5. An operation method of operating a passive optical network system comprising a main station, a plurality of subsidiary stations, and an optical fiber network comprising an optical splitter for connecting the main station to the subsidiary stations, comprising:
measuring, by the main station, a transmission distance or a transmission period of time between the main station and each of the subsidiary stations;
selecting by the main station, based on a result of the measurement, either one of a first transmission speed and a second transmission speeds to conduct the communication between the main station and each of the subsidiary stations; and
conducting, by the main station, the communication with each of the subsidiary stations at the selected one of the first and second transmission speeds.

6. An operation method of operating a passive optical network system comprising a main station, a plurality of subsidiary stations, and an optical fiber network comprising an optical splitter for connecting the main station to the subsidiary stations, comprising:
conducting, by the main station, the communication with each of the subsidiary stations at a first transmission speed to measure a transmission distance or a transmission period of time between the main station and the subsidiary station; and
conducting, if a result of the measurement is a predetermined value, communication between the main station and the subsidiary station by replacing the first transmission speed with the second transmission speed.

7. An operation method of operating a passive optical network system according to claim 5, wherein:
the second transmission speed is a transmission speed greater than the first transmission speed; and
communication is conducted at the second transmission speed if the transmission distance or the transmission period of time between the main station and each of the subsidiary stations is equal to or less than a predetermined value as a result of the measurement.

* * * * *